US012472120B2

(12) United States Patent
Cooper et al.

(10) Patent No.: US 12,472,120 B2
(45) Date of Patent: Nov. 18, 2025

(54) INFLATION-MEDIATED PRESSURE THERAPY GARMENT

(71) Applicant: InCare, LLC, Lewes, DE (US)

(72) Inventors: Pamela Cooper, Brooklyn, NY (US); Michael Morath, Brooklyn, NY (US)

(73) Assignee: InCare, LLC, Lewes, DE (US)

( * ) Notice: Subject to any disclaimer, the term of this patent is extended or adjusted under 35 U.S.C. 154(b) by 510 days.

(21) Appl. No.: 17/500,220

(22) Filed: Oct. 13, 2021

(65) Prior Publication Data

US 2022/0110822 A1 Apr. 14, 2022

Related U.S. Application Data

(60) Provisional application No. 63/091,117, filed on Oct. 13, 2020.

(51) Int. Cl.
*A61H 9/00* (2006.01)
*A41D 1/04* (2006.01)

(52) U.S. Cl.
CPC ............ *A61H 9/0078* (2013.01); *A41D 1/04* (2013.01); *A41D 2400/322* (2013.01); *A61H 2201/0103* (2013.01); *A61H 2201/0157* (2013.01); *A61H 2201/165* (2013.01); *A61H 2201/5048* (2013.01)

(58) Field of Classification Search
CPC .......... A61H 9/0078; A61H 2201/0103; A61H 2201/0157; A61H 2201/165; A61H 2201/1253; A61H 2201/50; A61H 2201/5025; A61H 2201/5071; A61H 2205/08; A61H 9/00; A61H 9/005; A61H 9/0085; A61H 9/0092; A61H 2201/5048; A41D 1/04; A41D 2400/322; A61D 2400/322
See application file for complete search history.

(56) References Cited

U.S. PATENT DOCUMENTS

| | | | | |
|---|---|---|---|---|
| 8,095,994 | B2 * | 1/2012 | Natonson | A61H 9/0078 2/102 |
| 10,046,096 | B2 * | 8/2018 | Askem | A61F 13/0246 |
| 10,145,036 | B1 * | 12/2018 | Sunshine | D02G 3/441 |
| 10,874,579 | B1 * | 12/2020 | Rembert | A61H 23/006 |
| 10,935,861 | B1 * | 3/2021 | Rhodes | G02F 1/13338 |

(Continued)

FOREIGN PATENT DOCUMENTS

| | | | | |
|---|---|---|---|---|
| EP | 2644179 | A2 * | 10/2013 | A61H 9/0007 |
| WO | WO-2009150026 | A1 * | 12/2009 | A41D 1/005 |

*Primary Examiner* — Timothy A Stanis
*Assistant Examiner* — Tyler A Raubenstraw
(74) *Attorney, Agent, or Firm* — Fish & Richardson P.C.

(57) ABSTRACT

A garment provides therapeutic pressure to the body of a wearer in response to a two-factor authentication system. The garment includes reversibly inflatable chambers configured to press against the body of a wearer. The garment includes a pump fluidly connected to the chambers and a controller. The controller sends an inflation signal to the pump to inflate the chambers and a deflation signal to the pump to deflate the chambers. The garment includes touch-sensitive fabric. In some implementations, the controller sends the inflation signal to the pump in response to one or more touches to the touch responsive fabric. In some implementations, the controller sends the inflation signal to the pump in response to biometric data.

20 Claims, 17 Drawing Sheets

(56) References Cited

U.S. PATENT DOCUMENTS

| | | | | |
|---|---|---|---|---|
| 12,223,814 | B2 * | 2/2025 | Chandramowle .. | G08B 13/2417 |
| 2003/0074711 | A1 * | 4/2003 | Iversen | A61H 9/0078 434/236 |
| 2004/0097845 | A1 * | 5/2004 | Van Brunt | A61H 9/0078 601/44 |
| 2008/0222771 | A1 * | 9/2008 | Natonson | A61H 9/0078 2/102 |
| 2012/0022414 | A1 * | 1/2012 | Receveur | A61H 9/0078 601/152 |
| 2013/0261518 | A1 * | 10/2013 | Hansen | A61H 23/04 601/152 |
| 2013/0267877 | A1 * | 10/2013 | Van Brunt | A61H 9/0007 601/149 |
| 2014/0094726 | A1 * | 4/2014 | Malhi | A61F 13/08 601/152 |
| 2014/0316314 | A1 * | 10/2014 | Schubert | A61H 9/0092 601/149 |
| 2014/0330186 | A1 * | 11/2014 | Hyde | A61F 2/70 602/19 |
| 2015/0025425 | A1 * | 1/2015 | Mitchell | A61H 1/008 601/96 |
| 2015/0051518 | A1 * | 2/2015 | Zhou | A61H 1/00 601/18 |
| 2015/0202115 | A1 * | 7/2015 | Aronson | A61H 9/0078 601/11 |
| 2015/0366504 | A1 * | 12/2015 | Connor | A61B 5/6804 600/301 |
| 2015/0366746 | A1 * | 12/2015 | Ashby | G16H 40/63 601/49 |
| 2016/0008206 | A1 * | 1/2016 | Devanaboyina | A61M 21/02 601/136 |
| 2016/0220808 | A1 * | 8/2016 | Hyde | A61B 5/6895 |
| 2017/0035122 | A1 * | 2/2017 | Farron | A41D 1/04 |
| 2017/0095395 | A1 * | 4/2017 | Wennen | A61F 5/02 |
| 2017/0156976 | A1 * | 6/2017 | Shockley, Jr. | A61B 5/4833 |
| 2017/0209332 | A1 * | 7/2017 | Chase | A61F 13/12 |
| 2017/0224280 | A1 * | 8/2017 | Bozkurt | G01L 5/0014 |
| 2018/0049939 | A1 * | 2/2018 | Bobey | A61H 7/004 |
| 2018/0146510 | A1 * | 5/2018 | Gray | A41D 13/0051 |
| 2018/0272147 | A1 * | 9/2018 | Freeman | G16H 50/30 |
| 2018/0301012 | A1 * | 10/2018 | Carlson | B61L 25/025 |
| 2018/0360463 | A1 * | 12/2018 | Rubinstein | A61H 9/0092 |
| 2019/0015233 | A1 * | 1/2019 | Galloway | B25J 15/12 |
| 2019/0059461 | A1 * | 2/2019 | Walker | A41D 1/005 |
| 2019/0133215 | A1 * | 5/2019 | Whalen | A63B 21/4011 |
| 2020/0093679 | A1 * | 3/2020 | Sonar | G01L 5/228 |
| 2020/0113773 | A1 * | 4/2020 | Ramanan | A61H 9/0092 |
| 2020/0116139 | A1 * | 4/2020 | Murison | A61H 23/0218 |
| 2020/0207057 | A1 * | 7/2020 | Bowles | A61B 5/291 |
| 2020/0276077 | A1 * | 9/2020 | Chiu | A61H 9/0007 |
| 2020/0297574 | A1 * | 9/2020 | Poon | A61H 31/005 |
| 2020/0316365 | A1 * | 10/2020 | Hyde | A63B 22/0076 |
| 2020/0367585 | A1 * | 11/2020 | Horton | A41D 1/02 |
| 2020/0375283 | A1 * | 12/2020 | Check | A41D 13/1236 |
| 2021/0045466 | A1 * | 2/2021 | Lieu | A41D 13/008 |
| 2021/0354041 | A1 * | 11/2021 | Thompson | A63F 13/214 |
| 2021/0355613 | A1 * | 11/2021 | Dion | D04B 21/202 |
| 2021/0386615 | A1 * | 12/2021 | Suarez | A61H 9/0092 |

* cited by examiner

INFLATION-MEDIATED PRESSURE THERAPY GARMENT

CROSS-REFERENCE TO RELATED APPLICATIONS

This application claims the benefit of U.S. Provisional Application Ser. No. 63/091,117 filed Oct. 13, 2020, the entire contents of which are incorporated by reference in its entirety.

TECHNICAL FIELD

This document relates to a garment, for example, a wearable garment such as a vest, jacket, shirt, or undergarment.

BACKGROUND

For individuals with some forms of sensory seeking or sensory-over responsive reactions, pressure on the body has been shown to provide comfort and calm. Wearable garments are one way to provide this pressure.

SUMMARY

This disclosure describes a wearable garment that provides pressure against the body of a wearer.

In some implementations, a garment includes a wearable fabric. The wearable fabric includes a plurality of reversibly inflatable chambers configured to press against a wearer's body when inflated. The garment includes a pump connected to the plurality of reversibly inflatable chambers and configured to inflate and to deflate the inflatable chambers. The garment includes a controller, where the controller sends an inflation signal or a deflation signal to the pump, and the pump inflates or deflates the inflatable chambers in response to the inflation or deflation signal. The garment includes touch responsive fabric, configured to provide an initiation signal to the controller. In response to the initiation signal, the controller sends the inflation signal to the pump.

This aspect, taken alone or combinable with any other aspect, can include the following features. The garment includes a one-way valve configured to allow the reversibly inflatable chambers to be manually deflated when the one-way valve is opened.

This aspect, taken alone or combinable with any other aspect, can include the following features. The reversibly inflatable chambers are uniformly distributed throughout the garment.

This aspect, taken alone or combinable with any other aspect, can include the following features. The reversibly inflatable chambers are configured to press against specific points of the wearer's body when inflated.

This aspect, taken alone or combinable with any other aspect, can include the following features. Only inflatable chambers in a selected inflation location on the garment are inflated in response to the inflation signal from the controller.

This aspect, taken alone or combinable with any other aspect, can include the following features. The touch responsive fabric is uniformly distributed throughout the garment.

This aspect, taken alone or combinable with any other aspect, can include the following features. The touch responsive fabric includes one or more capacitive touch pads.

This aspect, taken alone or combinable with any other aspect, can include the following features. The capacitive touch pads are removeably positioned on the garment.

This aspect, taken alone or combinable with any other aspect, can include the following features. The capacitive touch pads are held in place by hook and clasp fasteners, snap pins, or other reversible connectors.

This aspect, taken alone or combinable with any other aspect, can include the following features. The capacitive touch pads are activated by touch from a human hand.

This aspect, taken alone or combinable with any other aspect, can include the following features. Activated capacitive touch pads provide the initiation signal to the controller.

This aspect, taken alone or combinable with any other aspect, can include the following features. The touch responsive fabric is configured to transition between an activated state and an inactivated state.

This aspect, taken alone or combinable with any other aspect, can include the following features. In the activated state, the touch responsive fabric provides the initiation signal to the controller in response to a touch to the fabric from the wearer. In the inactivated state, the touch responsive fabric ceases to provide the initiation signal to the controller in response to the touch to the fabric from the wearer.

This aspect, taken alone or combinable with any other aspect, can include the following features. Only touch responsive fabric in a selected touch responsive location on the garment transitions to the activated state.

This aspect, taken alone or combinable with any other aspect, can include the following features. The touch responsive fabric provides the initiation signal to the controller in response to a first touch to the touch responsive fabric by the wearer and a second signal.

This aspect, taken alone or combinable with any other aspect, can include the following features. The second signal is a second touch to the touch responsive fabric by the wearer.

This aspect, taken alone or combinable with any other aspect, can include the following features. The second signal is a voice command.

This aspect, taken alone or combinable with any other aspect, can include the following features. The controller further comprises a location sensor.

This aspect, taken alone or combinable with any other aspect, can include the following features. The location sensor is configured to provide location data to the controller, and the controller is configured to send the inflation signal or the deflation signal to the pump in response to the location data.

This aspect, taken alone or combinable with any other aspect, can include the following features. The controller is configured to send the inflation signal or the deflation signal to the pump at a predetermined time of day.

This aspect, taken alone or combinable with any other aspect, can include the following features. The garment includes biometric sensors attached to the wearable fabric. The biometric sensors are configured to provide biometric data from the wearer to the controller.

This aspect, taken alone or combinable with any other aspect, can include the following features. The biometric sensors are configured to sense heart rate, respiration, transpiration, body temperature, or blood pressure.

This aspect, taken alone or combinable with any other aspect, can include the following features. The controller sends the inflation signal or the deflation signal to the pump in response to the biometric data.

This aspect, taken alone or combinable with any other aspect, can include the following features. The controller initiates a program that sends inflation and deflation signals to the pump in a programmed sequence.

This aspect, taken alone or combinable with any other aspect, can include the following features. The controller is configured to initiate the program in response to biometric data provided to the controller.

This aspect, taken alone or combinable with any other aspect, can include the following features. The controller is configured to initiate an alternative program in response to a change in the biometric data provided to the controller.

This aspect, taken alone or combinable with any other aspect, can include the following features. The controller is configured to stop the program in response to a change in the biometric data provided to the controller.

This aspect, taken alone or combinable with any other aspect, can include the following features. The controller sends the inflation signal to the pump in response to an external signal.

This aspect, taken alone or combinable with any other aspect, can include the following features. The external signal is a signal from a smartphone application.

This aspect, taken alone or combinable with any other aspect, can include the following features. The smartphone application is configured to allow the wearer or a user to create a custom inflation program.

This aspect, taken alone or combinable with any other aspect, can include the following features. The smartphone application is configured to provide a therapeutic program to the controller, and the controller sends inflation and deflation signals to the pump in a programmed therapeutic sequence.

This aspect, taken alone or combinable with any other aspect, can include the following features. The garment is a vest.

This aspect, taken alone or combinable with any other aspect, can include the following features. The vest includes magnetic closures.

This aspect, taken alone or combinable with any other aspect, can include the following features. The garment is reflective.

This aspect, taken alone or combinable with any other aspect, can include the following features. The garment is an undergarment.

This aspect, taken alone or combinable with any other aspect, can include the following features. The wearable fabric can include airtight fabric.

The details of one or more implementations of the disclosure are set forth in the accompanying drawings and the description that follows. Other features, objects, and advantages of the disclosure will be apparent from the description and drawings, and from the claims.

DESCRIPTION OF DRAWINGS

Like reference symbols in the various drawings indicate like elements.

DETAILED DESCRIPTION

Reference has been made in detail to certain implementations of the disclosed subject matter, examples of which have been illustrated in part in the accompanying drawings. While the disclosed subject matter has been described in conjunction with the enumerated claims, it will be understood that the disclosed subject matter is not intended to limit the claims.

In some implementations, a therapy garment can provide pressure to the body of a wearer using reversibly inflatable chambers. For example, a therapy garment can include multiple reversibly inflatable chambers, which, when inflated, provide a therapeutic pressure against the body of a wearer.

A therapy garment that provides pressure to the body of the wearer can have many advantageous effects. Pressure on the body of the wearer can be both pleasurable and therapeutic. For example, pressure can provide a soothing sensation. In some instances, a garment that provides pressure to the body can be therapeutic for individuals with autism, or individuals who experience stress, distress, anxiety, or have sensory seeking or sensory over-responsive reactions. In some implementations the pressure is controlled by a two factor activation protocol, such that the pressure sensation occurs only in response to intentional activation. In some implementations, the garment can be customized to the individual wearer, for example by customization of the two factor authentication protocol, or by customization of the duration and location of provided pressure.

The garments described herein can take a number of forms. A person skilled in the art will recognize that the features of the garments described herein can be incorporated into different types of clothing. For example, the garment can be a vest, jacket, shirt, or undergarment.

In addition, the garments described herein can be configured to be worn outside of standard clothing. For example, the garment can be a jacket, coat, or vest. Alternatively, the garments described herein can be configured to be worn underneath standard clothing. For example, the garment can be worn as an undershirt or undergarment. Further, the garments described herein can be configured to be incorporated into standard clothing, for example a vest that can be reversibly attached to the inside of a standard jacket or coat.

FIGS. 1-4 and 6-7 show an example implementation of a garment, wherein the garment is a vest. However, a person skilled in the art will recognize that the features illustrated in the figures are not limited to vests, and can be incorporated into different types of clothing, including outerwear and underwear.

Figure 1A:
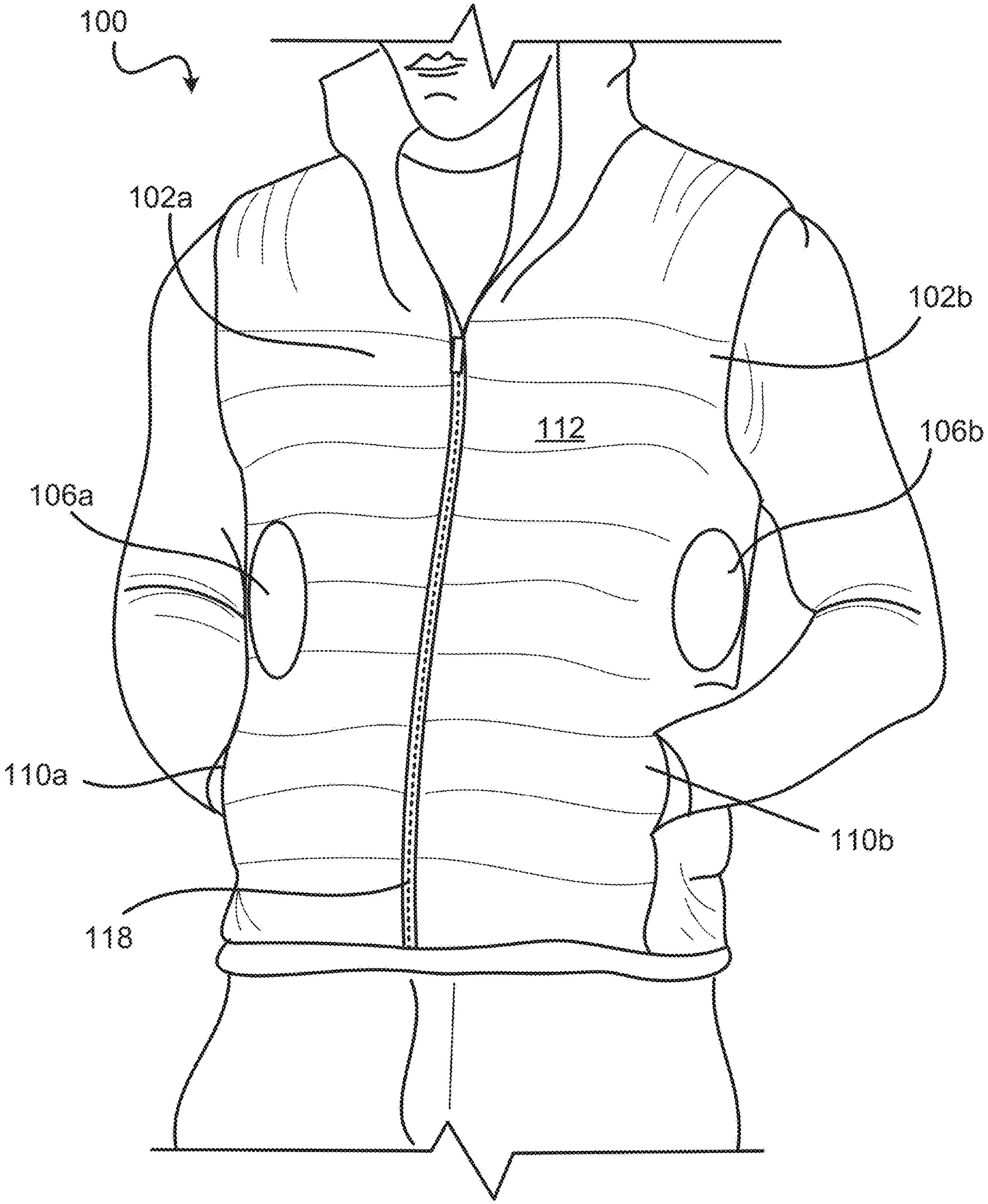
FIG. 1A shows an example schematic of a front view of a garment.
Figure 1B:
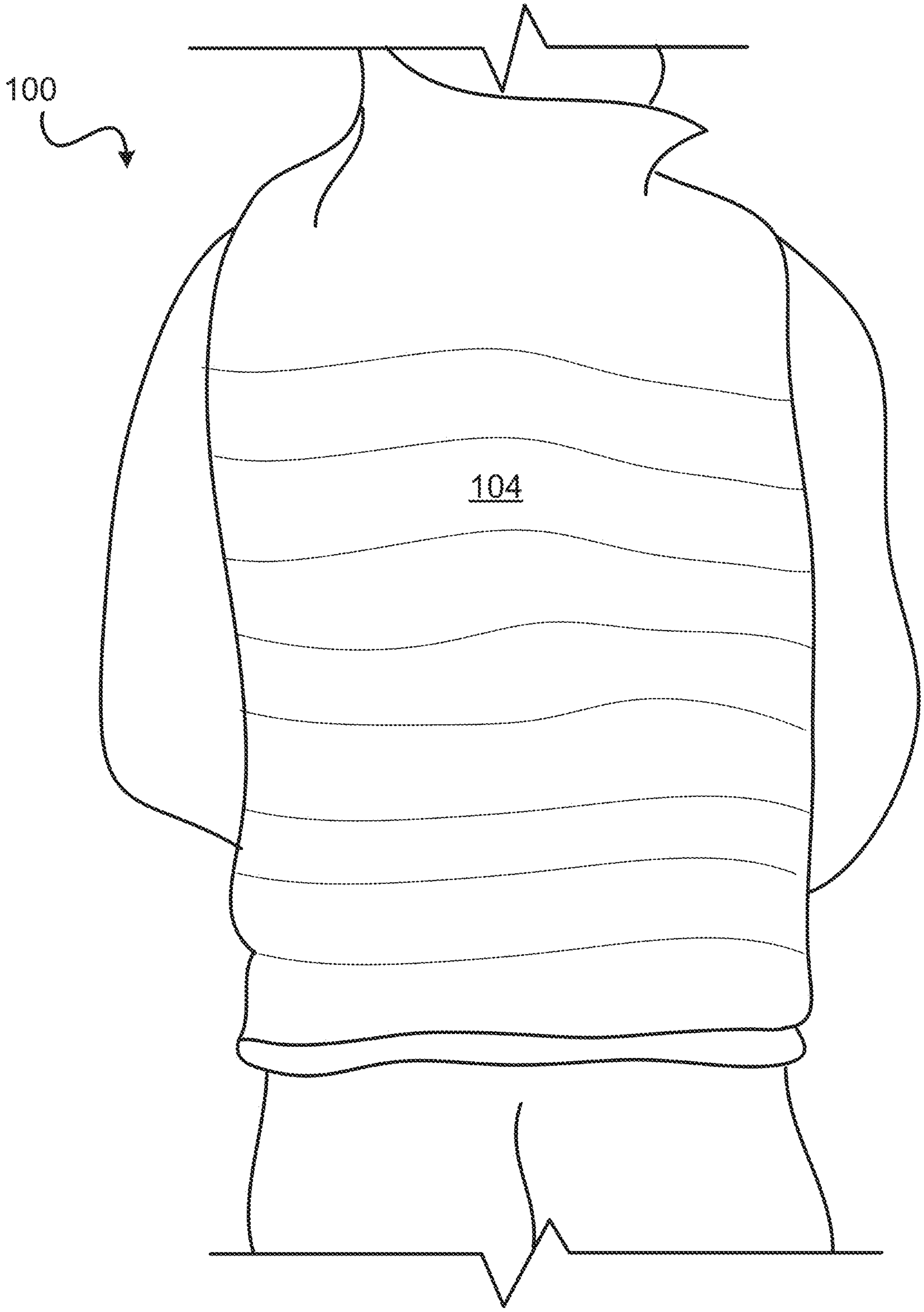
FIG. 1B shows an example schematic of a back view of the garment shown in FIG. 1A.

FIG. 1A and FIG. 1B are different views of an example schematic of a garment 100. In some implementations, the garment 100 is a garment configured to be worn on the upper body, for example, a vest. In some implementations, the garment 100 can include reversibly inflatable chambers 106, for example a reversibly inflatable chamber 106 on opposite sides of the garment, as shown in FIG. 1A. The garment can include a wearable fabric 112. In some implementations, the fabric 112 is a non-woven, synthetic fabric. For example, the fabric 112 can be polyester, poly-vinyl chloride, or spandex. In some implementations, the fabric 112 can be a blend of synthetic and non-synthetic fabrics. In some implementations, the fabric 112 is at least 60% synthetic fabric. In some implementations, that garment includes a back panel 104 and side panels 102*a* and 102*b*. The panels are a section of wearable fabric 112 and can include an inner layer and an outer layer of fabric. In some implementations, the fabric can include a middle layer, for example padding or an insulating layer. The panels are joined together, for example, by sewing, ultrasonic sewing, or welding, to form the garment 100. In some implementations, the garment includes a closure 118, for example buttons, hook and clasp fasteners, magnetic closures, or a zipper. In some implementations, the garment can include one more pockets, for example pockets 110*a* and 110*b*. In some implementations, the garment includes elements configured to adjust the size of the garment to the individual wearing the garment. In some implementations, the garment 100 includes elastic bands that hold the garment against the wearer, for example, an elastic band incorporated into the garment 100 that circles the waist of the wearer when the garment is worn. In some implementations, the garment 100 includes cinching elements, configured to allow the wearer to cinch and secure the garment tightly against their body. Adjustable cinching elements, elastic bands, or other elements configured to adjust the size of the garment ensure that the garment is held tightly against the body of the wearer. A tight fit ensures that inflated chambers provide pressure to the wearer as intended.

In some implementations, the fabric 212 can be a reflective fabric. Reflective fabric can increase the visibility of a wearer in low-light situations and can increase the safety of the person wearing the garment.

Figure 2A:
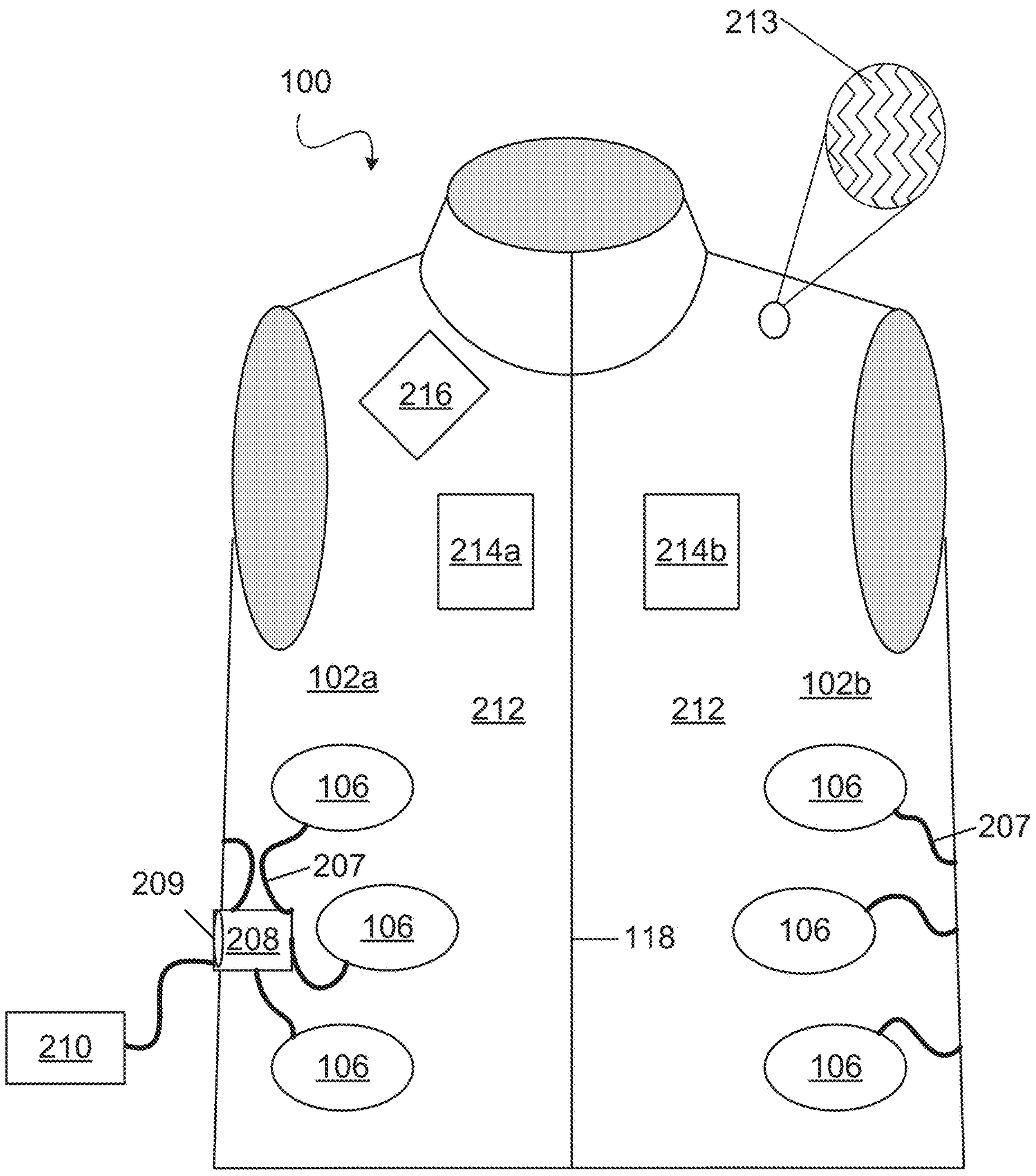
FIG. 2A shows an example schematic of a front view of a first implementation of the garment shown in FIG. 1A.
Figure 2B:
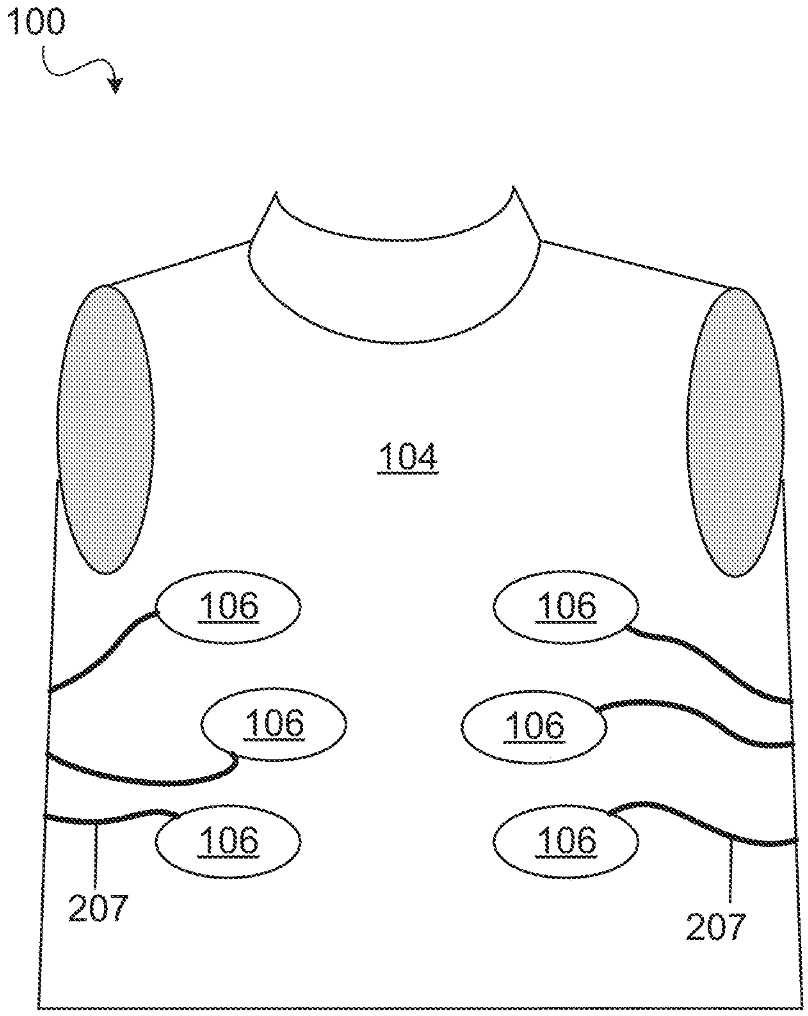
FIG. 2B shows an example schematic of a back view of a first implementation of the garment shown in FIG. 1A.

FIGS. 2A and 2B show different views of an example schematic of a garment 100 with further detail as to the components of some implementations. FIG. 2A shows a front view. FIG. 2B shows a back view. The garment 100 can include one or more reversibly inflatable chambers 106. These chambers can be configured to press against the body of a wearer when inflated. The chambers 106 can include a flexible outer body that is configured to reversibly inflate and deflate. The chambers 106 can be integrated into the garment. For example, the chambers 106 can be positioned in between two layers of fabric, for example between an inner layer of fabric and an outer layer of fabric. Alternatively, the chambers can be placed or affixed in a pocket 110*a* or 110*b* in the garment 100. In some implementations, the chambers 106 are fluidly connected to a pump 208, for example by tubing 207. The pump 208 is configured to inflate and deflate the chambers 106 via the tubing 207. The pump 208 is described in more detail below.

The chambers 106 can be uniformly distributed in the garment to create a uniform sensation of pressure when the chambers 106 are inflated. Alternatively, the reversibly inflatable chambers can be located in specific areas of the garment, for example in the upper half of the garment, on the lower half of the garment, or at locations in the garment that correspond to specific pressure points on a wearer. In some implementations, the reversibly inflatable chambers can be placed inside pockets of the garment, for example inside pockets 110*a* and 110*b*.

Figure 3A:
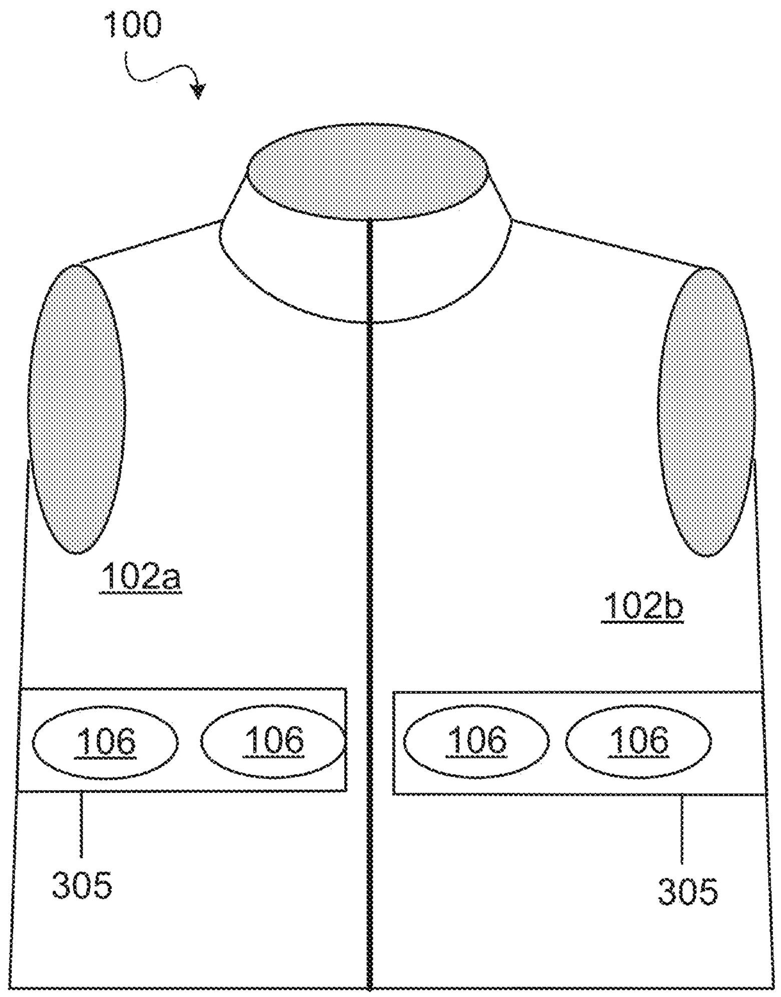
FIG. 3A shows an example schematic of a front view of a second implementation of the garment shown in FIG. 1A.
Figure 3B:
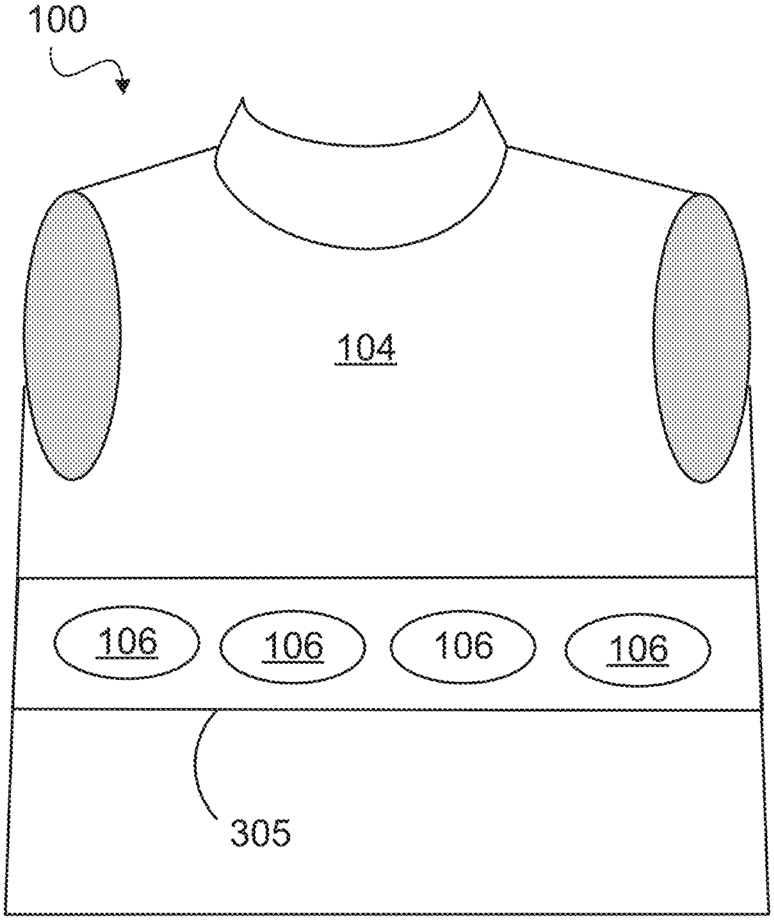
FIG. 3B shows an example schematic of a back view of a second implementation of the garment shown in FIG. 1A.

FIGS. 3A and 3B show different views of an example schematic of a front and back view of a garment 100 with the reversibly inflatable chambers 106 placed in a ring around the garment, corresponding to a midsection of a wearer. In some implementations, the garment includes an inner belt-style pocket element 305. The pocket element 305 can be inside the garment or between layers of fabric in the garment, and can wrap partially or fully around the wearer of the garment. The belt-style pocket element 305 can protect the electronic components, for example the pump, controller, and batteries. The pocket element 305 can surround the electronic component in in a flexible sleeve. The pocket element 305 protects the electronics from moisture, dust, or dirt and allows the electronic components to be removed for replacement or to removed before the garment 100 is washed. In some implementations the entire pocket element 305, including the electronic components, can be removed from the garment, for example before washing, and then reattached to the cleaned garment.

Figure 4:
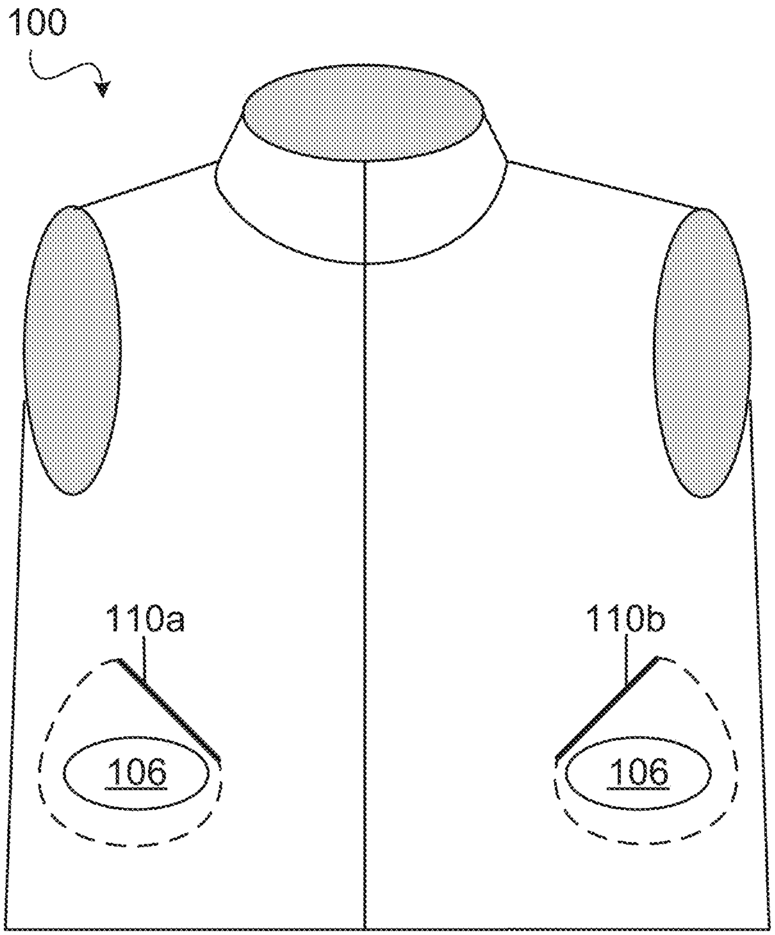
FIG. 4 shows an example schematic of a front view of a third implementation of the garment shown in FIG. 1A.

FIG. 4 shows an example schematic of a front view of a garment 100 with a reversibly inflatable chamber 106 placed in each pocket 110*a* and 110*b* of the garment. As shown in FIGS. 1-4, using a plurality of chambers 106 at different positions in the garment allows for an even weight distribution that is comfortable for the wearer, and for fast inflation time. In addition, multiple small chambers can be used to provide discrete points of pressure, as opposed to a large uniform inflatable chamber. The chambers 106 can be tailored to the individual needs of the wearer. Further, the use of multiple inflatable chambers allows for the selective inflation of fewer than all of the chambers, which in turn allows for customization or multiple types of pressure patterns. A pressure pattern can be spatial, where specific chambers in the garment are inflated, whereas others are not. A pressure pattern can also vary over time, like a massage. The customization of the pressure patterns can increase the comfort of the wearer. In addition, the ability to create multiple types of pressure patterns can prevent the wearer from becoming desensitized by repetition of the same pressure pattern.

In some implementations, the garment includes a pump 208. The pump 208 is configured to inflate and deflate the chambers 106. The pump 208 can draw ambient air from outside the garment in order to inflate the chambers. In some implementations, the pump is integrated into the garment, for example between an inner layer and outer layer of fabric, with an aperture 209 to the exterior of the garment. Alternatively, the pump can be held in a pocket of the garment 100. In some implementations, the pump can be housed in a pocket element 305. The pump 208 can be powered by batteries, for example a rechargeable battery that is integrated into the pump 208, or by replaceable batteries.

The action of the pump 208 can be controlled by a controller 210. The controller is described in more detail, below. In some implementations, the pump 208 and the controller 210 are housed together in a hard or semi-flexible outer shell. The outer shell can include an aperture configured to allow the pump 208 to draw ambient air. In some implementations, the pump 208 is attached to tubing 207 via a reversible connector. For example, the tubing and pump can be connected by a snap connector with a tight seal. Alternatively, the tubing 207 and the pump 208 can be connected by a magnetic seal. The snap seal or the magnetic seal can provide an easy and reversible connection, and allow the pump to be easily connected, disconnected, and reconnected to the tubing. This can be advantageous in situations where the pump needs to be temporarily removed, for example during cleaning, battery replacement, maintenance, or for an inspection.

The pump 208 can be configured to, in response to a signal, inflate all of the reversibly inflatable chambers 106 simultaneously, to inflate all of the reversibly inflatable chambers different times, or to inflate only some of the chambers. The pump can be configured to inflate and deflate some or all of the chambers in a pressure pattern, in order to generate a pulsed pressure or a rolling pressure sensation, like a massage.

In some implementations, the pump includes a switchable valve. The valve can be configured so that in a first position, the chambers 106 can be inflated and in a second position, the chambers 106 can be deflated.

In some implementations, the reversibly inflatable chambers 106 can be deflated manually. For example, the reversibly inflatable chambers 106 can include a one-way valve, configured to release air and deflate the chambers 106 in response to opening the valve. The valve can be opened by squeezing or pinching, or by remove a reversible stopper or cover. Accordingly, by pressing or uncovering the valve, the chambers 106 can be manually deflated.

In some implementations, the garment includes more than one pump 208. For example, two pumps can be placed in opposite side pockets of the garment. The use of multiple pumps can result in an even weight distribution that is more comfortable for the wearer. In addition, the use of multiple pumps can result in a faster inflation time than the use of a single pump. Further, using multiple pumps can reduce the size of the individual pumps necessary to fully inflate the chambers 106 in a desired amount of time.

The pump 208 can be configured to respond to an inflation signal to inflate the chambers 106 and configured to respond to a deflation signal to deflate the chambers 106. The inflation and deflation signals can be sent to the pump from a controller 210. The controller 210 can be configured to determine when to send an inflation or deflation signal based on one or more sources of input. For example, the controller can be configured to send an inflation signal on demand from a wearer or caretaker, either by direct interaction with the controller or by a separate device such as a smartphone or computer. In some implementations, the controller can be configured to send an inflation or deflation signal in response to a touch signal or in response to biometric data from the user, as described in more detail below. In some implementations, the controller can be configured to send inflation and deflation signals in response to the wearer entering a geographical location. In some implementations, the controller can be configured to send inflation and deflation signals in response to the time of day.

In some implementations, the controller 210 sends an inflation signal to the pump 208 in response to a touch from the user. A touch can be a continuous or momentary contact between the hand or hands of the wearer and a touch responsive element. In some implementations, the touch responsive element is one or more capacitive touch pads 214. The capacitive touch pads can be permanently affixed to the garment 100, for example sewn, welded, glued, or otherwise attached to the garment 100. In some implementations, the capacitive touch pads are removeably attached to the garment, for example by hook and clasp fasteners, snaps, buttons, magnets, or other reversible connectors. In some implementations, the capacitive touch pads can be arranged on the garment in response to a preference or the needs of the wearer. For example, if a wearer responds to stress or sensory stimulation by touching a known location on their body, the capacitive touch pads can be placed in that location. Alternatively, if a wearer finds the capacitive touch pads more comfortable in a specific location on the garment, the capacitive touch pads can be placed in that location.

In some implementations, the capacitive touch pads sense a touch by sensing a change in the electromagnetic field cause by a human hand positioned in close proximity to the capacitive touch pad 214. The change in the electromagnetic field can be detected and interpreted as a touch interaction. A processor in the controller can then interpret this data and send an inflation signal to the pump 208.

Figure 5:
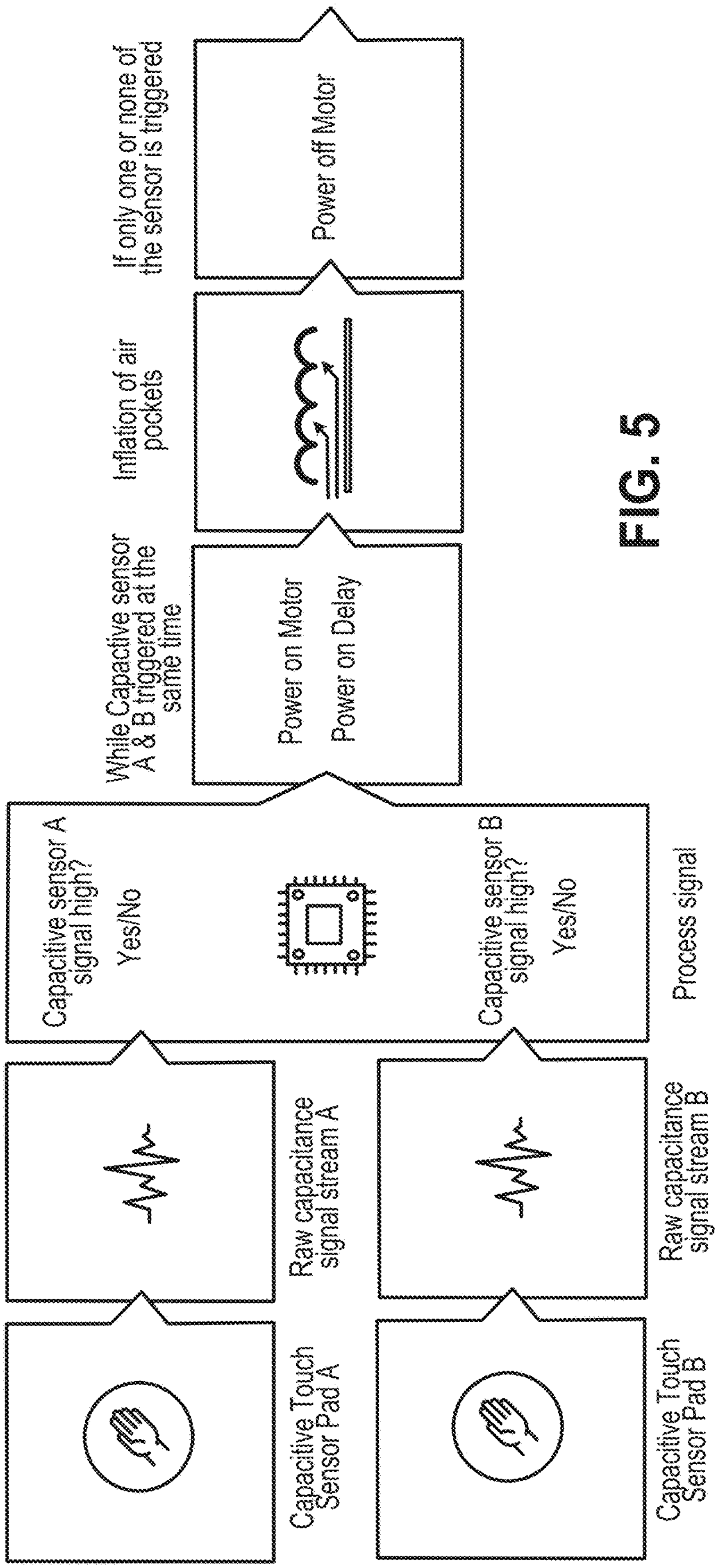
FIG. 5 shows an example schematic of a two factor activation process for using the garment shown in FIG. 1A.

In some implementations, the controller 210 will send the inflation signal to the pump 208 in response to a touch signal from at least two capacitive touch pads. This is an example of a two factor activation protocol, where two discrete touches are required to send the inflation signal to a pump. FIG. 5 shows an example schematic of a two factor activation protocol. For example, a first capacitive touch pad 214*a* can send a raw capacitive signal stream A to the controller, where the processor determines if the capacitive signal exceeds a predetermined threshold. A capacitive signal that exceeds the predetermined threshold is interpreted as a touch. A second capacitive touch pad 214*b* can send a raw capacitive signal stream B to the controller, where the processor determines if the capacitive signal exceeds a threshold and is interpreted as a touch. If both the capacitive signal stream A and signal stream B indicate a touch, the controller can send the inflation signal to the pump. If only one capacitive touch pad indicates a touch, the controller does not send an inflation signal to the pump. In addition, if one or both of the capacitive touch pads cease to indicate a touch, the controller can send the deflation signal to the pump, removing the pressure provided by inflated chambers 106. A two factor activation protocol, for example, the example activation protocol shown by the example schematic in FIG. 5, ensures that the chambers are intentionally inflated and prevents unwanted inflation or inflation that is triggered too easily.

In some implementations, the touch responsive element is touch responsive fabric. In some implementations, the garment 100 includes touch responsive fabric 212. In some implementations, the touch responsive fabric includes capacitive fibers 213. In some implementations, the capacitive fibers sense a touch by sensing a change in the electromagnetic field cause by a human hand positioned in close proximity to the capacitive fibers 213. The change in the electromagnetic field can be detected and interpreted as a touch interaction. A processor in the controller can then interpret this data and send an inflation signal to the pump 208.

The touch responsive fabric can be uniformly distributed throughout the garment on the outer surface of the garment, away from the body of the wearer. For example, an outer layer of the garment 100 can be substantially made of touch responsive fabric 212. Alternatively, select portions or regions of the garment can include the touch responsive fabric.

In some implementations, the touch responsive fabric is capable of reversible activation. For example, the touch responsive fabric 212 can have an inactive state and an active state. The activation state of the touch responsive fabric can be controlled by the controller. Specific regions of the touch responsive fabric 212 can be switched into the active state. When the touch responsive fabric is in the active state, it will send a signal to the controller in response to a touch from the wearer. When the touch responsive fabric is in the inactive state, it will not send a signal to the controller in response to a touch from the wearer. This allows a wearer or a user to select certain regions of the garment to become touch responsive. For example, if a wearer, in response to stress or sensory stimuli, hugs themselves in a predictable manner, the wearer of the garment, or a caretaker, can select those regions to be activated. This allows the garment to distinguish between a touch signal that indicates a need for inflation versus touches that do not indicate a need for inflation. The reversibly activated fabric can then also be personalized or uniquely tailored to the wearer, or can be changed if the habits or needs of the wearer change. This makes the garment dynamically adaptable to the needs of the wearer.

In some implementations, the controller 210 will send the inflation signal to the pump 208 in response to a signal from the touch responsive fabric 212, where the signal is generated by a single touch from a wearer. In some implementations, a two factor activation protocol responds to multiple signals. For example, the controller can send the inflation signal to the pump when it senses a first touch and a second touch in a different location on the garment, simultaneously. For example, if a wearer hugs themselves and places their hands on opposite shoulders, the touch responsive fabric would indicate two unique touches and the controller would send the inflation signal to the pump.

In some implementations, under a two factor activation protocol, the controller 210 will send the inflation signal to the pump 208 in response to a touch and a second signal. The second signal can be a voice command from the wearer. The controller 210 can include a microphone capable of detecting a spoken command and a processor capable of interpreting the command. Alternatively, the controller can be programmed to work in conjunction with existing devices that can interpret voice commands, for example a smartphone or a virtual assistant. In some implementations, the voice command is sensed by an external microphone, for example a microphone in a smartphone or personal electronic device. For example, a smartphone with voice recognition can be used to send a second signal to the controller 210 in response to a voice command. In some implementations, an application, for example a smartphone application, can be configured to send a second signal to the controller 210 in response to a voice command.

In some implementations, the controller can send the inflation or deflation signal to the pump in response to location data. For example, the controller can sense that a wearer has entered a physical location and send the inflation signal to the pump. The controller can respond to location data provided by an integrated location sensor. For example, the controller itself can include an integrated location sensor. In some implementations, the location data is provided by a non-integrated component, for example, a smartphone.

In some implementations, the controller can send the inflation signal or deflation signal to the pump in response to biometric data. The garment 100 can include one or more biometric sensors 216. In some implementations, the biometric sensors are imbedded in the garment, for example sewn, welded, glued, or otherwise attached to the fabric. In some implementations, the biometric sensor is on the inside of the garment, next to the body of the wearer. In some implementations, the biometric sensor can be configured to be in contact or in close proximity of the skin of a wearer. In some implementations, the biometric sensor is a personal electronic device, for example a smartphone, smartwatch, or other external biometric sensor. The biometric sensor can be configured to monitor a biometric state. For example, the biometric sensor 216 can be configured to measure heart rate, respiration, body temperature or blood pressure. The biometric sensor 216 can be configured to provide this biometric data to the controller 210. The controller 210 can send the inflation signal to the pump in response to the biometric data. For example, the controller 210 can send the inflation signal to the pump when the heart rate of a wearer exceeds a threshold. The threshold can be a predetermined number of beats per minute, or the threshold can be based on resting heart rate. For example, if the heart rate of a wearer exceeds a certain percentage of their resting heart rate, the controller can send the inflation signal to the pump. Similarly, if the heart rate returns to a baseline or below a predetermined threshold, the controller 210 can send the deflation signal to the pump. In some implementations, the controller 210 can send the inflation signal to the pump in response to biometric data that is outside a range of acceptable baseline values, and send the deflation signal to the pump when the biometric data returns to within the range of baseline values. This allows the garment to respond in real time to the needs of the user, based on biometric signals that may or may not be apparent to the wearer or a caretaker. Similar procedures can be used for the other types of biometric data. For example, when the respiration, body temperature, or blood pressure of a wearer exceeds or drops below a predetermined threshold or exits the range of acceptable values of those metrics, the controller can send a signal to the pump to inflate or deflate the chambers 106. In addition, the garment 100 can provide pre-emptive therapeutic pressure in response to the early signs of distress in a user. For example, a panic attack or stress response may be preceded by an increase in heart rate or perspiration. The controller can be configured to interpret one or more biometric signals as indicative of a panic attack or stress response and initiate a therapeutic pressure program. This may help alleviate or prevent the imminent panic attack or stress response, thus improving the quality of life of the wearer.

In some implementations, the controller is configured to send inflation and deflation signals to the pump in a programmed sequence. The programmed sequence can include signals to inflate and deflate some or all of the chambers in a predetermined manner. For example, the program can be a therapeutic program that results in a massage-like function where the chambers are inflated sequentially, creating a rolling pressure sensation. Alternatively, the program can result in pulses of pressure as the chambers inflate and deflate. The program can be customized by the wearer or a user such as a caretaker or friend. For example, the wearer or user can select series of chambers to be inflated and the duration of the inflation of each chamber. In some implementations, the controller can be configured to run a select program in response to biometric data. For example, in response to a heart rate that exceeds a predetermined threshold, the controller can initiate a soothing massage program selected by the wearer. Accordingly, the program can be customized to the needs or preferences of a user. In some implementations, the controller can provide the ability to create a therapeutic program, for example through the use of integrated user interface. In some implementations, the therapeutic program can be created remotely, for example through the use of a corresponding smartphone application, website, or computer program. In some implementations, the controller or the smartphone or computer application can provide a variety of premade therapeutic programs that the wearer or user can select. In some implementations, a wearer or user who creates therapeutic programs can share the programs with other wearers or users, for example by sharing the therapeutic program through the smartphone application or website.

In some implementations, the controller can initiate a pressure program in response to an input from a person not wearing the garment, such as a caretaker, family member, or friend. For example, the controller can respond to a request, from a caretaker, family member, or friend, to “hug” the wearer. Accordingly, a virtual “hug” from a friend can be translated into a physical sensation. The controller can be configured to respond to a signal from a smartphone application or a messaging system, so that a friend can “send a hug,” from a remote location.

In some implementations, the garment 100 can be used together with a website, computer program, smartphone application, or virtual assistant to create an enhanced therapy experience. For example, the garment 100 can run therapeutic pressure program simultaneously with an audio or visual program provided by a computer program, website, smartphone application, or virtual assistant. This can create a therapy program that incorporates both the therapeutic pressure from the garment 100 as well as audio or visual aids. For example, a smartphone application can guide a wearer through a relaxation exercise such as a breathing exercise, meditation, or visualization, and the garment 100 can simultaneously run a therapeutic pressure program, inflating and deflating the chambers 106 in synchronization with the relaxation exercise.

In some implementations, a website, computer program, smartphone application, or virtual assistant can track the use of the garment 100 and can provide feedback on the use and effectiveness of the garment 100. For example, the feedback can include when and how often the garment 100 is used to create a therapeutic pressure program, and the effects of the program on biometric data, for example, heart rate. This creates a feedback loop that allows the wearer or a caretaker to track the effectiveness of the garment, set reminders to use the garment, and evaluate their progress over time. This also allows the wearer or caretaker to evaluate the best therapeutic programs for the wearer, and further personalize or tailor the therapeutic programs based on quantifiable data. This can make the garment 100 and the therapy provided by the garment more understandable, customizable, and effective.

Figure 6A:
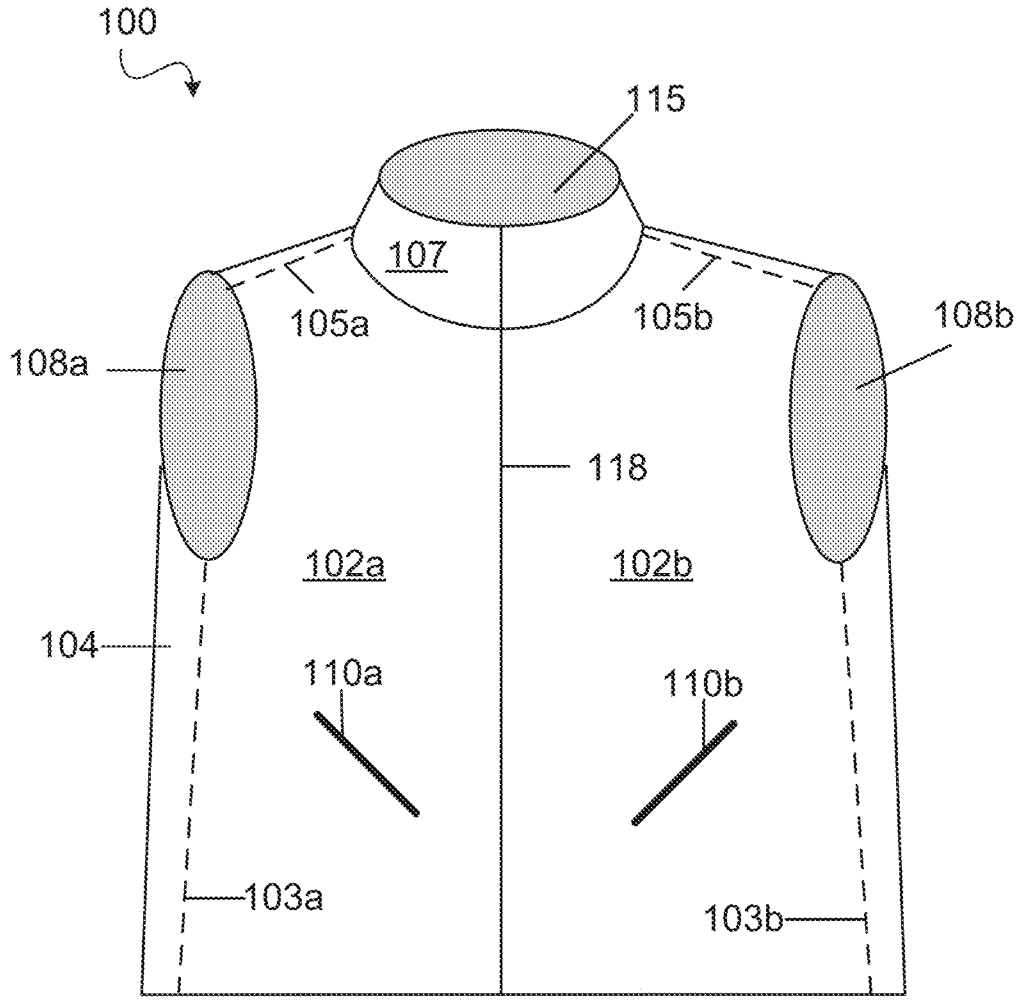
FIG. 6A shows an example schematic of a front view of the garment shown in FIG. 1A.
Figure 6B:
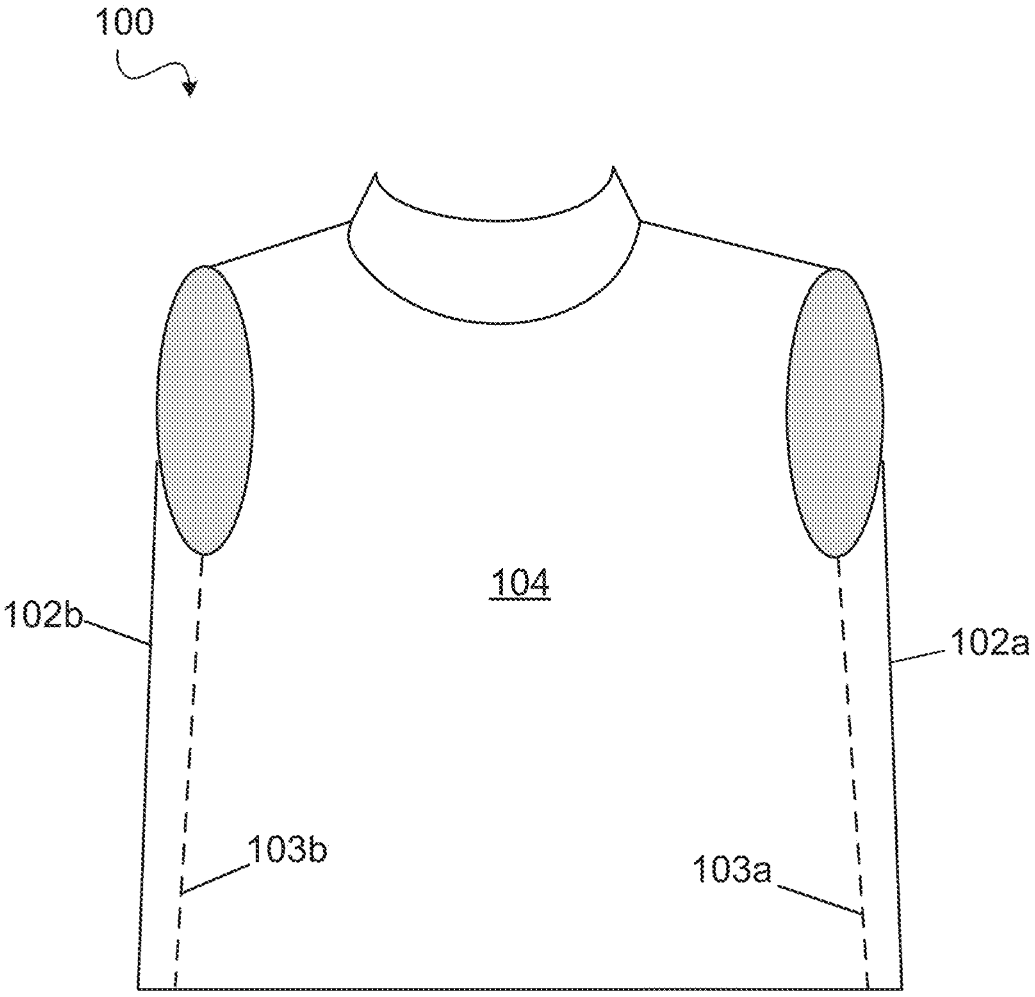
FIG. 6B shows an example schematic of a back view of the garment shown in FIG. 1A.

FIG. 6A and FIG. 6B show different views of an example schematic of a garment that can be configured to provide a pressure sensation to a wearer. FIG. 6A shows a front view. FIG. 6B shows a back view. The garment 100 can be, for example, a vest. The vest can be configured to be worn on the upper body of a person, with suitable openings for the neck, arms, and torso. In some implementations, the garment 100 includes panels of wearable fabric 112. The panels can include an inner layer and an outer layer of fabric. In some implementations, the fabric can include a middle layer, for example padding or an insulating layer. In some implementations, the garment 100 includes side panels 102*a* and 102*b*. In some implementations, the side panels are joined to a back panel 104 along the side seams 103*a* and 103*b* and along the shoulder seams 105*a* and 105*b*. The seams are formed at the edges at which two panels are joined. The panels can be joined by sewing, ultrasonic sewing, welding, gluing, or other suitable means for attaching fabric together. In some implementations, the side panels and back panels are one continuous piece of fabric. In some implementations, the garment 100 includes a reversible closure 118 between the two side panels. This closure can be a zipper, hook and clasp fasteners, buttons, or a magnetic closure. The choice of closure can be tailored to the needs of the wearer. For example, for individuals with limited mobility, a magnetic closure can provide an easy way to secure the garment. The garment 100 defines arm opening 108*a* and 108*b*, formed by the side and back panels. The garment 100 defines an opening for the head and neck 115. In some implementations, the garment 100 includes a collar 107. In some implementations, the vest can include one or more pockets, for example pockets 110*a* and 110*b*.

Figure 7A:
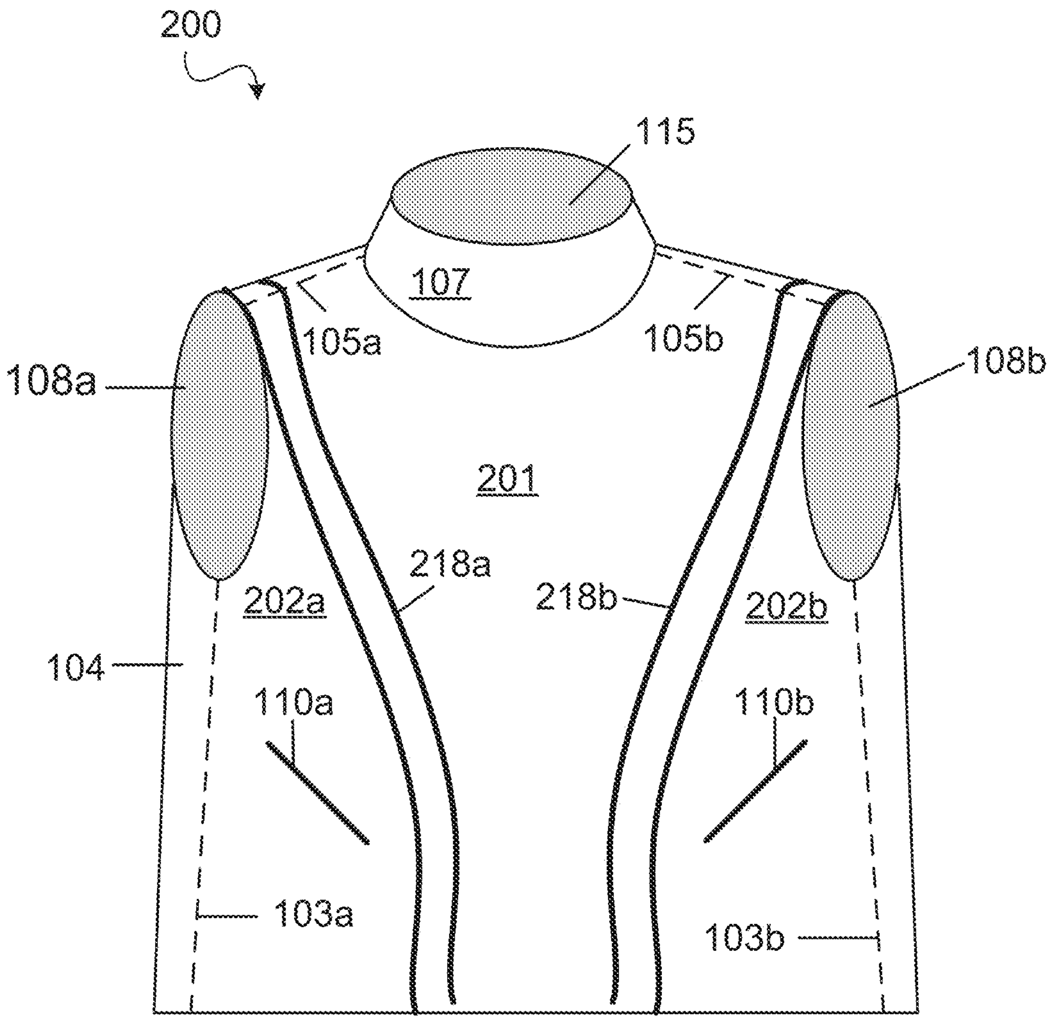
FIG. 7A shows an example schematic of a front view of a fourth implementation of the garment shown in FIG. 1A.
Figure 7B:
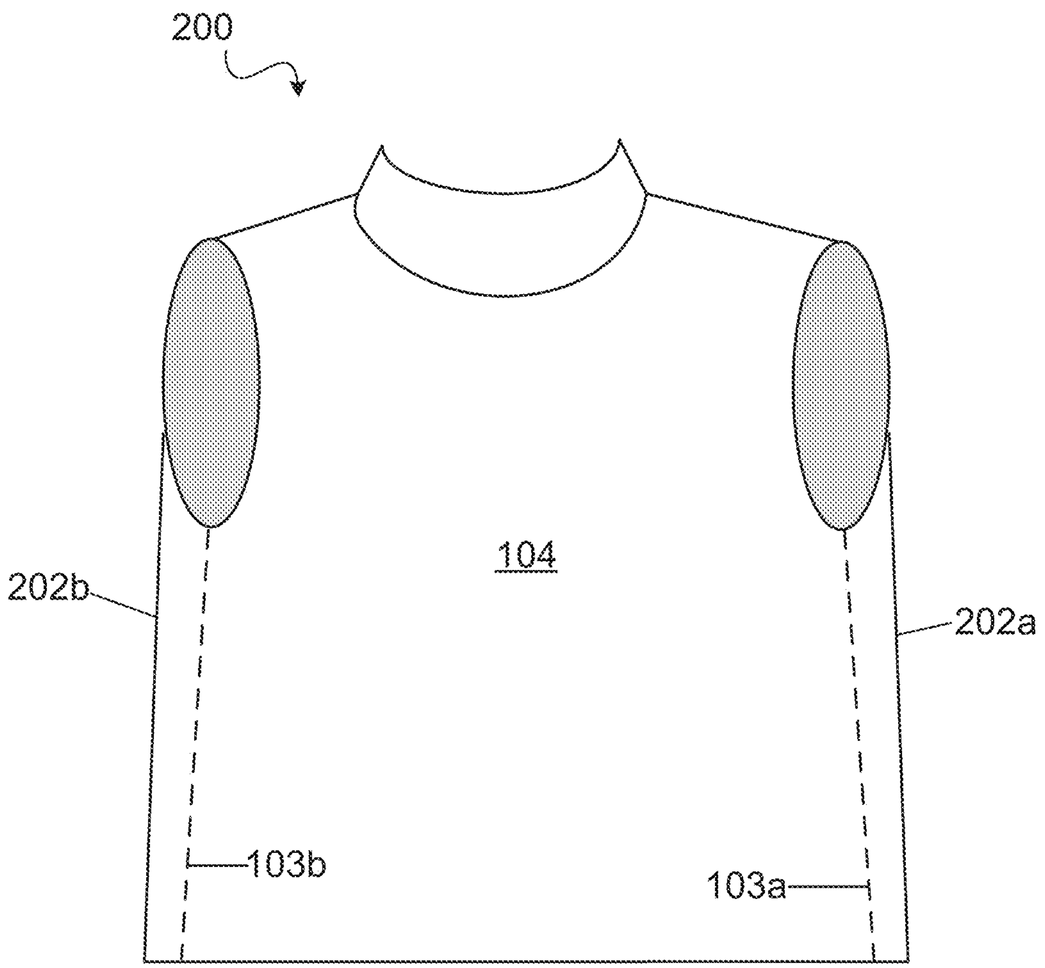
FIG. 7B shows an example schematic of a back view of a fourth implementation of the garment shown in FIG. 1A.

FIGS. 7A and 7B show different views of an example schematic of a garment 200 that can be configured to provide a pressure sensation to a wearer. FIG. 7A shows a front view. FIG. 7B shows a back view. The garment 200 can include the features substantially identical to the features included in garment 100, described above. In some implementations, the garment 200 can include side panels 202*a* and 202*b*, a back panel 104, and a middle panel 201. The side panels 202*a* and 202*b* are joined to the back panel 104 along seams 103*a* and 103*b*. The middle panel 201 is joined to the back panel 104 along seams 105*a* and 105*b*. In some implementations, the side, back, and middle panels can be one continuous piece of fabric. In some implementations, the garment 200 can include a collar 107. In some implementations, the garment 200 includes one or more pockets, for example pockets 110*a* and 110*b*.

In some implementations, the side panels and middle panel contains closures 218*a* and 218*b*, configured to reversibly attach to the middle panel 201 to the side panels 202*a* and 202*b*. For example, the closures can be zippers, buttons, snaps, hook and clasp fasteners, or magnetic closures. The choice of closure can be tailored to the dexterity of a wearer. For example, a magnetic closure or hook and clasp fasteners can make the garment 200 easier to secure for individuals with limited mobility.

In some implementations, the arm openings 108*a* and 108*b* are not completely enclosed until the middle panel 201 is secured to the side panels 202*a* and 202*b*. In other words, the circumference of the arm openings 108*a* and 108*b* is defined at least in part by the middle panel 201. Accordingly, when the garment 200 is in an open configuration, a wearer can slip their head and neck through the opening 115 and the garment will rest on their shoulders, approximately along the seams 105*a* and 105*b*. The wearer can then fasten the middle panel to the side panels, enclosing the arm openings and closing the garment. This can make the garment easier to don and doff. For example, an individual with limited mobility may find it difficult to direct their arms through a completely enclosed arm opening. The garment 200, which slips over the head of a wearer, may be easier for these individuals to don and doff. Further, if a wearer is being assisted in donning and doffing the garment 200, it may be easier for an assistant other than the wearer to position the garment 200 over the head of the wearer and subsequently close the garment, as opposed to needing to guide the arms of a wearer through completely enclosed arm opening.

Figure 8A:
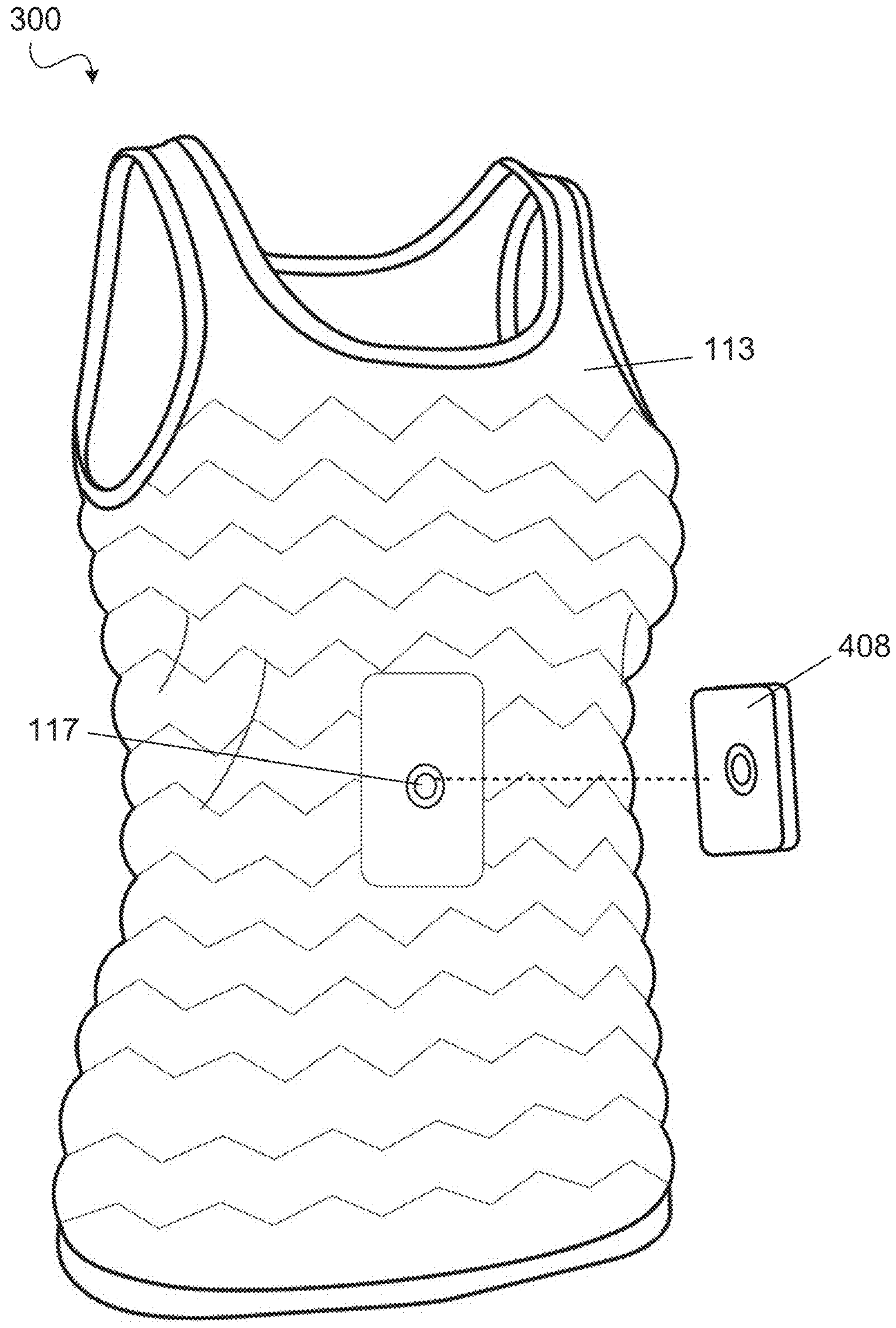
FIG. 8A shows an example schematic of a fifth implementation of the garment shown in FIG. 1A.
Figure 8B:
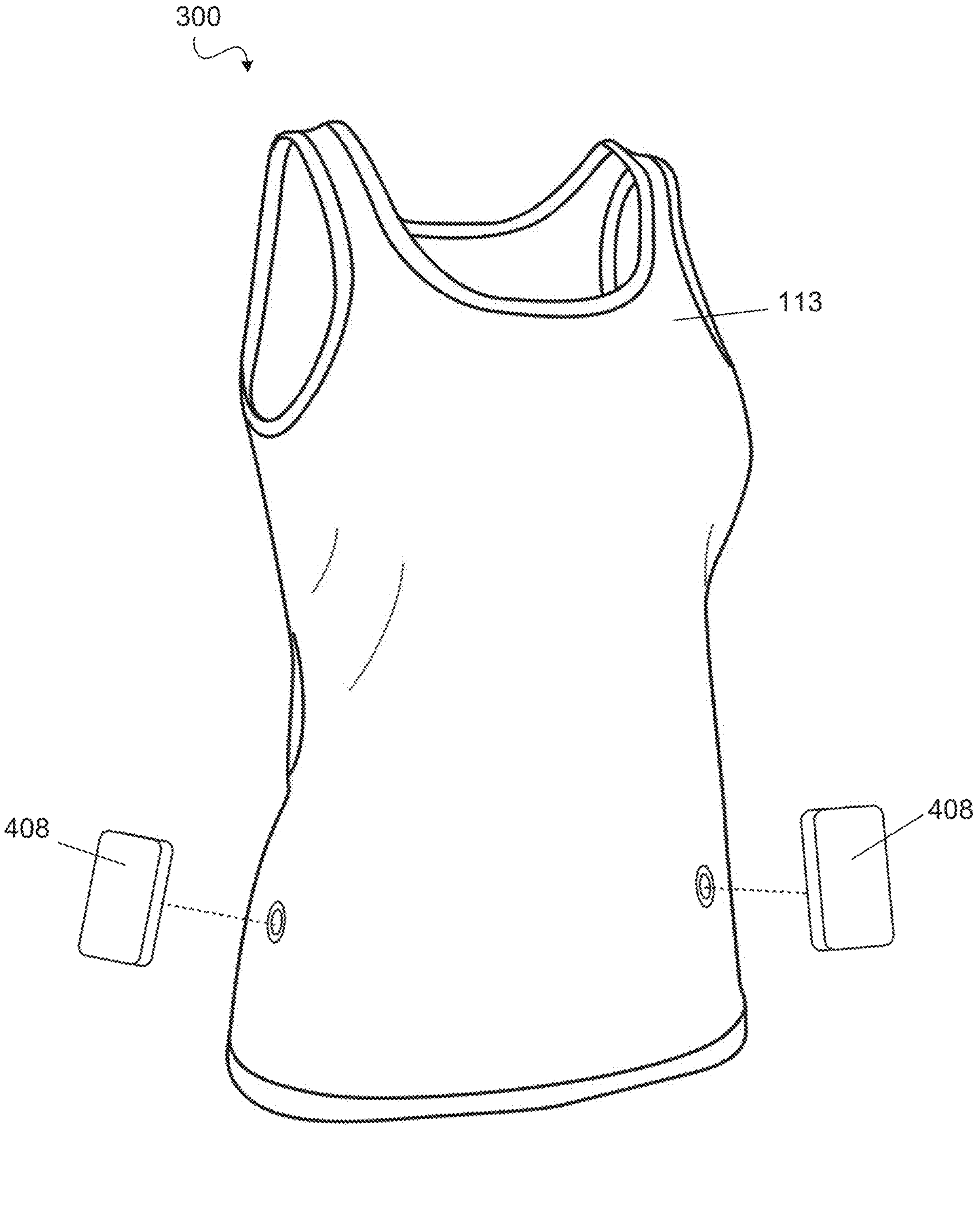
FIG. 8B shows an example schematic of a sixth implementation of the garment shown in FIG. 1A.
Figure 8C:
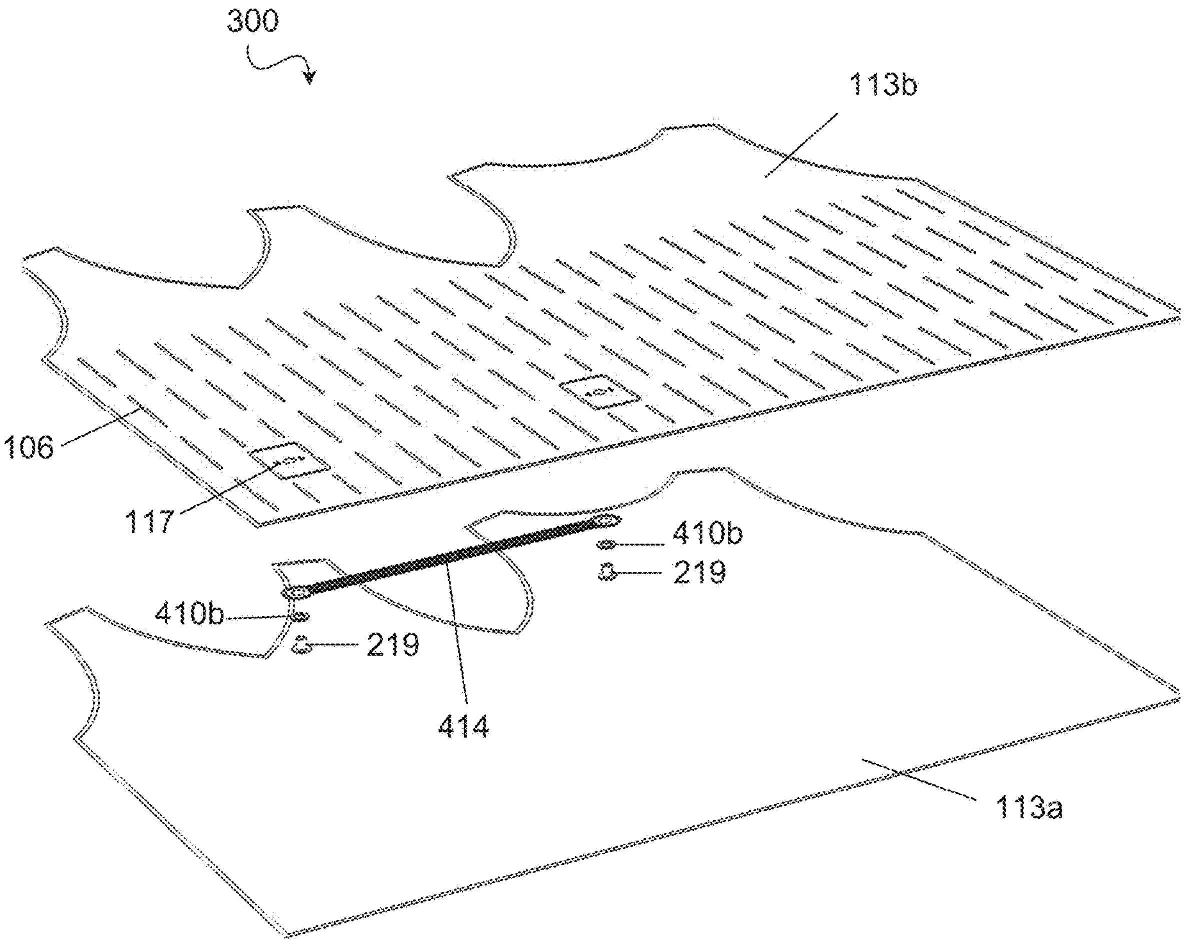
FIG. 8C shows an example schematic of an exploded view of a seventh implementation of the garment shown in FIG. 1A.

FIG. 8A shows an example schematic of a garment that can be configured to provide a pressure sensation to a wearer. The garment 100, 200, or 300 can include an inflation module 408. In some implementations, the garment 300 can include wearable, airtight fabric 113. The airtight fabric can be weldable. The inflation module can attach to the garment, for example by aligning with aperture 117. FIG. 8B shows an example garment 300 with more than one inflation module 408. FIG. 8C shows an example schematic of an exploded view of a garment 300. In some implementations, the garment includes an inner layer of airtight fabric 113*a* and an outer layer of airtight fabric 113*b*. The inner layer of airtight fabric 113*a* and the outer layer of airtight fabric 113*b* can be welded together to create the garment. In some implementations, the layers 113*a* and 113*b* are welded together in a pattern to create the inflatable chambers 106, for example by a patterned welding that adheres the layers 113*a* and 113*b* together at intervals, leaving a pattern of pockets where the layers 113*a* and 113*b* are not welded together and fluidly connected. In some implementations, the layers 113*a* and 113*b* are welded together at the edges of the garment. Accordingly, a pump can be configured to attach to an aperture 117 in the airtight fabric 113 to inflate the space between the inner layer of airtight fabric 113*a* and the outer layer of airtight fabric 113*b*. When inflated, the welding pattern of the layers 113*a* and 113*b* creates a bubbled or ridged pattern that provides pressure to the body of a wearer.

Figure 8D:
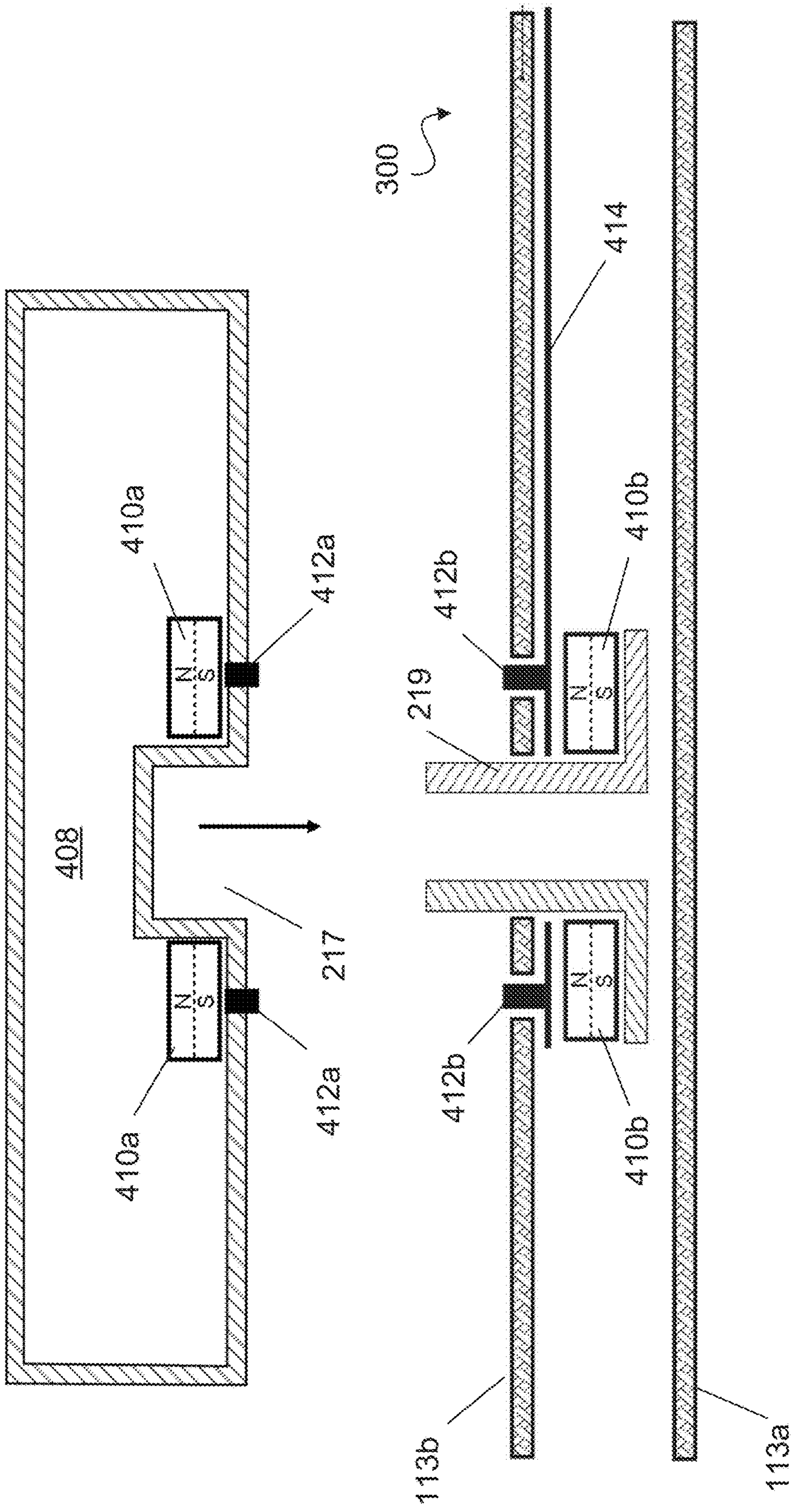
FIG. 8D shows an example schematic of an inflation module.

In some implementations, the garment 300 can include more than one inflation module 408. In some implementations, the garment 300 includes a printed circuit board 414. The printed circuit board 414 can be configured to be in electrical contact with the inflation modules 408. The inflation module 408 can be attached to the garment 300, for example with magnets 410*b* embedded in the garment. FIG. 8D shows an example schematic of an inflation module 408 and the garment 300. The inflation module 408 can include a pump, an opening 217 configured to connect to a valve 219, a controller, and a battery pack. The inflation modules can inflate the space between the layers 113*a* and 113*b* via an aperture 117 and a valve 219. In some implementations, the inflation module 408 can include one or more biometric sensors 216.

In some implementations, the inflation module 408 can be attached to a garment 300 using magnets 410. For example, magnets 410*a* in the inflation module can be configured to be attracted to corresponding magnets 410*b* embedded in the garment, for example embedded between the layers 113*a* and 113*b*. When the magnets 410*a* are aligned with the magnets 410*b*, the opening 217 of the inflation module 408 is held in airtight communication with the valve 219. The valve 219 is in communication with the space between the layers 113*a* and 113*b* of the airtight fabric. Accordingly, the inflation unit can be used to inflate the space between layers 113*a* and 113*b*. The magnetic connection makes attaching the inflation module to the garment easier, for example by helping the user align the inflation module 408 with the valve 219.

In some implementations, the garment includes more than one inflation module 408. The inflation modules 408 can contain electrical contacts 412*a*. The contacts 412*a* in the inflation module are configured to align with electrical contacts 412*b* in the wearable airtight fabric 113. The electrical contacts 412*b* can be connected to a flexible printed circuit board 414. The printed circuit board 414 is less bulky than wire connectors and can interconnect a plurality of inflation modules throughout the garment. In some implementations, the garment includes alternative modules, for example a biometric sensor module, a cooling or heating module, or a massage module. The alternative modules can also connect to the garment 300 using magnets. The alternative modules can connect to the printed circuit board 414 via electrical contacts.

In some implementations, the garment 100, 200, or 300 can be incorporated into another piece of clothing. In some implementations, the garment 100, 200, or 300 can include snaps, buttons, hooks, zippers, or a hook and loop closure configured to reversibly attach the garment 100, 200, or 300 to another piece of clothing. For example, the garment 100, 200, or 300 can be attached to the exterior of a shirt, undershirt, or sweater. In some implementations, the garment 100, 200, or 300 can be placed inside another piece of clothing. For example, the garment 100, 200, or 300 can be attached inside a sweater, jacket, coat, shirt, or dress. Incorporating the garment into another piece of clothing can increase the utility of the garment and allow the garment to be tailored to different sets of environmental conditions. For example, if the garment is incorporated into a coat it can be worn outdoors or worn at colder temperatures. In addition, incorporating the garment inside another piece of clothing can make the garment less visible, which can increase the privacy of the person wearing the garment. For example if the individual wearing the garment prefers that the garment not be visible, it can be incorporated inside another piece of clothing.

Figure 9:
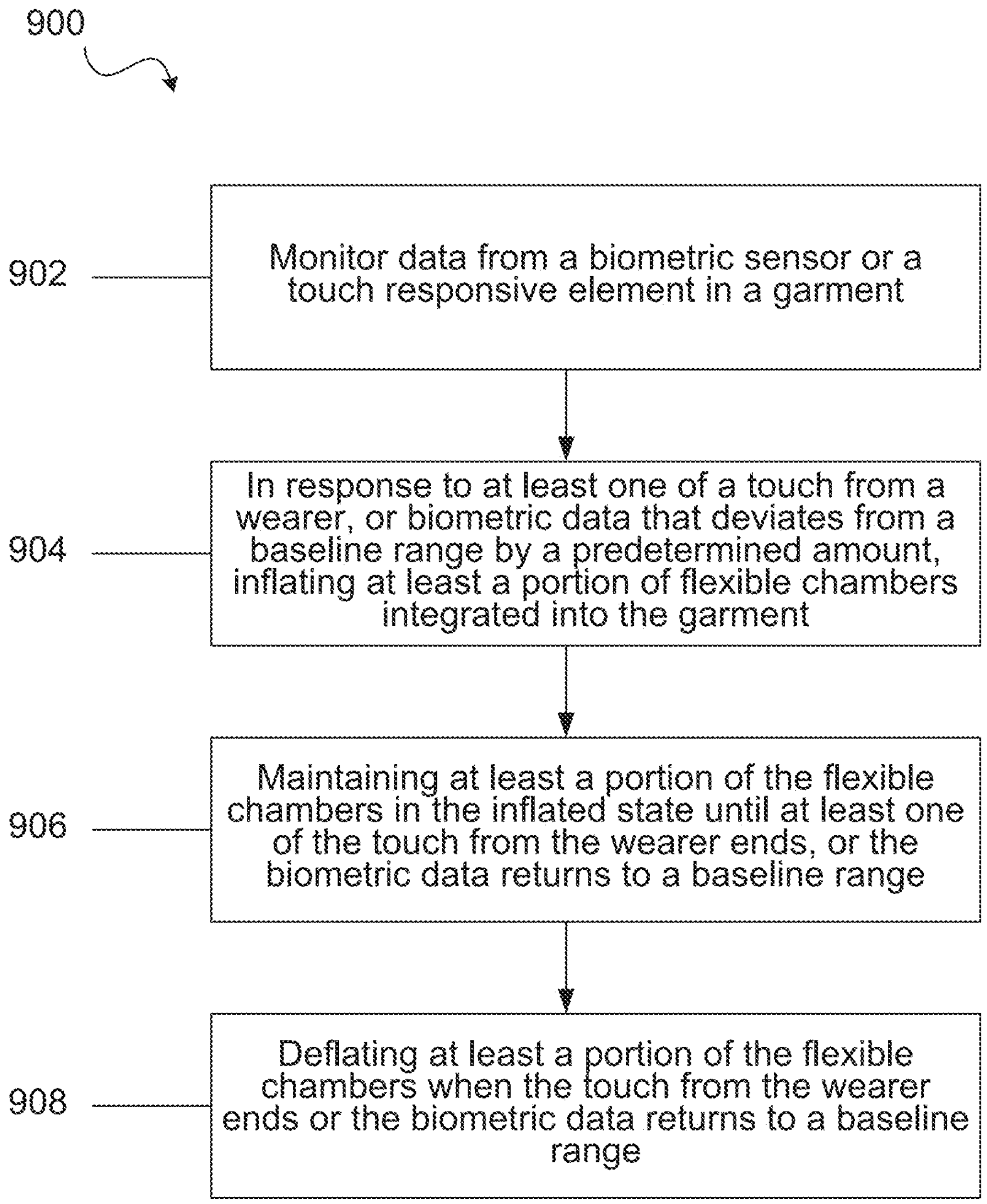
FIG. 9 is an example flow chart of a method of using the garment shown in FIG. 1A.

FIG. 9 shows a flowchart of an example method 900 of using the garment 100, 200, or 300. At 902, data from a biometric sensor or a touch responsive element in a garment is monitored. At 904, in response to at least one of a touch from a wearer or biometric data that deviates from a baseline range by a predetermined amount, at least a portion of flexible chambers integrated into the garment are inflated. At 906, the inflation is maintained until the touch from the wearer ends or the biometric data returns to a baseline range. At 908, at least a portion of the flexible chambers are deflated in response to the touch from the wearer ending or the biometric data returning to a baseline range.

In some implementations, the garment 100, 200, or 300 can be used for non-human animals. For example, the relative size and positions of the openings defined by the garment 100, 200, or 300 can be configured to fit a dog, cat, or other domestic animal. Accordingly, the garment 100, 200, or 300 can be used to provide therapeutic pressure to an animal which may be experiencing distress. In animal applications, the touch responsive fabric can be activated by an owner or caretaker to inflate the reversibly inflatable chambers 106. In some implementations, the inflation signal can be provided by a remote application, such as a smartphone application or remote control. In some implementations, the inflation signal can be provided by the animal wearing the garment, for example, by a remote control. The remote control can be configured to be useable by the animal, for example by including a button or pressure sensitive component that the animal can trigger by pressing or stepping on the button or component.

The term "about" as used in this disclosure can allow for a degree of variability in a value or range, for example, within 10%, within 5%, or within 1% of a stated value or of a stated limit of a range.

The term "substantially" as used in this disclosure refers to a majority of, or mostly, as in at least about 50%, 60%, 70%, 80%, 90%, 95%, 96%, 97%, 98%, 99%, 99.5%, 99.9%, 99.99%, or at least about 99.999% or more.

A number of implementations of the disclosure have been described. Nevertheless, it will be understood that various modifications may be made without departing from the spirit and scope of the disclosure.

What is claimed is:

1. A garment, comprising:

a wearable fabric, wherein the wearable fabric comprises a plurality of reversibly inflatable chambers configured to press against a wearer's body when inflated;

a pump, configured to be connected to the plurality of reversibly inflatable chambers and configured to inflate and to deflate the inflatable chambers, the pump integrated into the garment between layers of the wearable fabric;

a controller, wherein the controller sends an inflation signal or a deflation signal to the pump, wherein the pump inflates or deflates the inflatable chambers in response to the inflation or deflation signal; and touch responsive fabric configured to provide an initiation signal to the controller, wherein in response to the initiation signal, the controller sends the inflation signal to the pump, wherein the touch responsive fabric is configured to transition between an activated state and an inactivated state, wherein, in the activated state, the touch responsive fabric provides the initiation signal to the controller in response to a touch to the fabric from the wearer, wherein, in the inactivated state, the touch responsive fabric ceases to provide the initiation signal to the controller in response to the touch to the fabric from the wearer, wherein the controller is configured to control an activation state of the touch responsive fabric to switch specific regions of the touch responsive fabric into the activated state.

2. The garment of claim 1, further comprising a one-way valve configured to allow the reversibly inflatable chambers to be manually deflated when the one-way valve is opened.

3. The garment of claim 1, wherein the reversibly inflatable chambers are uniformly distributed throughout the garment.

4. The garment of claim 1, wherein the reversibly inflatable chambers are configured to press against specific points of the wearer's body when inflated.

5. The garment of claim 1, wherein only inflatable chambers in a selected inflation location on the garment are inflated in response to the inflation signal from the controller.

6. The garment of claim 1, wherein the touch responsive fabric is uniformly distributed throughout the garment.

7. The garment of claim 1, wherein the touch responsive fabric comprises one or more capacitive touch pads, and wherein the one or more capacitive touch pads are:

removeably positioned on the garment; and held in place by hook and clasp fasteners, snap pins, or other reversible connectors.

8. The garment of claim 7, wherein the one or more capacitive touch pads are activated by touch from a human hand, and wherein activated capacitive touch pads provide the initiation signal to the controller.

9. The garment of claim 1, wherein only touch responsive fabric in a selected touch responsive location on the garment transitions to the activated state.

10. The garment of claim 1, wherein the touch responsive fabric provides the initiation signal to the controller in response to a first touch to the touch responsive fabric by the wearer and a second signal, and wherein the second signal is:

a second touch to the touch responsive fabric by the wearer; or a voice command.

11. The garment of claim 1, wherein the controller further comprises a location sensor, and wherein the location sensor is configured to provide location data to the controller, and the controller is configured to send the inflation signal or the deflation signal to the pump in response to the location data.

12. The garment of claim 1, wherein the controller is configured to send the inflation signal or the deflation signal to the pump at a predetermined time of day.

13. The garment of claim 1, wherein the garment further comprises biometric sensors attached to the wearable fabric, wherein the biometric sensors are configured to provide biometric data from the wearer to the controller, and wherein the biometric sensors are configured to sense heart rate, respiration, transpiration, body temperature, or blood pressure, and wherein the controller sends the inflation signal or the deflation signal to the pump in response to the biometric data.

14. The garment of claim 1, wherein the controller initiates a program that sends inflation and deflation signals to the pump in a programmed sequence, and wherein the controller is configured to initiate the program in response to biometric data provided to the controller, and wherein the controller is configured to:

initiate an alternative program in response to a change in the biometric data provided to the controller; or stop the program in response to a change in the biometric data provided to the controller.

15. The garment of claim 1, wherein the controller sends the inflation signal to the pump in response to an external signal.

16. The garment of claim 15, wherein the external signal is a signal from a smartphone application, and wherein the smartphone application is configured to:

allow the wearer or a user to create a custom inflation program; or provide a therapeutic program to the controller, wherein the controller sends inflation and deflation signals to the pump in a programmed therapeutic sequence.

17. The garment of claim 1, wherein the garment is an undergarment or a vest, wherein the vest comprises magnetic closures.

18. The garment of claim 1, wherein the garment is reflective.

19. The garment of claim 1, wherein the wearable fabric comprises airtight fabric.

20. The garment of claim 1, wherein the controller is configured to send the inflation signal in response to the touch responsive fabric sending the initiation signal in response to a first touch at a first location on the touch responsive fabric and in responsive to the touch responsive fabric sending another initiation signal in response to a second touch at a second location on the touch responsive fabric.

* * * * *